(12) United States Patent
Kajihara et al.

(10) Patent No.: US 7,510,607 B2
(45) Date of Patent: Mar. 31, 2009

(54) COATING COMPOSITION AND METHOD FOR PRODUCING THE SAME

(75) Inventors: Kazuhisa Kajihara, Ehime (JP); Yoshiaki Takeuchi, Ehime (JP)

(73) Assignee: Sumitomo Chemical Company, Limited, Osaka (JP)

( * ) Notice: Subject to any disclaimer, the term of this patent is extended or adjusted under 35 U.S.C. 154(b) by 101 days.

(21) Appl. No.: 10/892,599

(22) Filed: Jul. 16, 2004

(65) Prior Publication Data
US 2005/0019557 A1    Jan. 27, 2005

(30) Foreign Application Priority Data
Jul. 23, 2003    (JP)    ............................ 2003-200310

(51) Int. Cl.
*C01F 7/02*    (2006.01)
*C01F 7/30*    (2006.01)
*C08K 3/22*    (2006.01)
*C09D 201/00*    (2006.01)
*C09D 5/23*    (2006.01)

(52) U.S. Cl. ................. 106/287.17; 106/499; 501/127; 501/153; 524/437

(58) Field of Classification Search ................ 106/499, 106/287.17; 501/127, 153; 428/692; 524/437
See application file for complete search history.

(56) References Cited

U.S. PATENT DOCUMENTS

| 5,242,752 | A | * | 9/1993 | Isobe et al. ................. 428/329 |
| 6,066,584 | A | * | 5/2000 | Krell et al. ................... 501/127 |
| 2003/0185746 | A1 | | 10/2003 | Kajihara et al. |
| 2004/0131856 | A1 | | 7/2004 | Kajihara et al. |

FOREIGN PATENT DOCUMENTS

JP    1-196723 A   *   8/1989
JP    2003-141714       5/2003

OTHER PUBLICATIONS

Yeh et al, "Low Temperature Sintering of Aluminum Oxide", Journal of American Ceramic Society, 71[10], pp. 841-844, (1988), no month.*

* cited by examiner

*Primary Examiner*—Anthony J Green
(74) *Attorney, Agent, or Firm*—Panitch Schwarze Belisario & Nadel LLP

(57) ABSTRACT

A coating composition, a method for producing the coating composition, a coating film and magnetic recording medium are described. The coating composition comprises a binder, a solvent, and an α-alumina powder, wherein the α-alumina powder satisfies the following (a) and (b):

(a) when the α-alumina powder is pressed to obtain a green body and the green body is sintered at 1250° C. under the atmospheric pressure, a relative density of the obtained sintered body is about 80% or more, and
(b) a BET specific surface area of the α-alumina powder is about 10 $m^2/g$ or more.

9 Claims, No Drawings

COATING COMPOSITION AND METHOD FOR PRODUCING THE SAME

BACKGROUND OF THE INVENTION

1. Field of the Invention

The present invention relates to a coating composition and a method for producing the same.

2. Description of Related Art

A magnetic recording medium such as a magnetic tape and the like is composed of a substrate and a magnetic recording layer for magnetic-recording a signal provided on the substrate. Of magnetic recording media, those having high recording density have a magnetic recording layer composed of a non-magnetic layer without a ferromagnetic powder and a magnetic layer with a ferromagnetic powder. Further, there are known multi-layer magnetic recording media having non-magnetic layers and magnetic layers laminated alternately on a substrate.

Magnetic recording media containing an α-alumina powder in these non-magnetic layers and magnetic layers are known.

A non-magnetic layer and a magnetic layer are formed, for example, by mixing a binder, a solvent, (a ferromagnetic powder) with an α-alumina powder, stirring them, to obtain a coating composition, and applying this coating composition on a substrate (Japanese Patent Application Laid-Open (JP-A) No. 2003-141714).

However, in conventional coating compositions, it has been difficult to form a layer, for example, non-magnetic layer, having a surface with high degree of smoothness on a substrate.

SUMMARY OF THE INVENTION

The present inventors have intensively studied to develop a coating composition capable of forming a layer having high degree of smoothness, and resultantly completed the present invention.

Namely, the present invention provides a coating composition comprising a binder, a solvent, and an α-alumina powder, wherein the α-alumina powder satisfies the following (a) and (b):

(a) when the α-alumina powder is pressed to obtain a green body and the green body is sintered at 1250° C. under the atmospheric pressure, a relative density of the obtained sintered body is about 80% or more, and (b) a BET specific surface area of the α-alumina powder is about 10 m$^2$/g or more.

The present invention provides a coating film comprising a binder and an α-alumina powder, wherein the α-alumina powder satisfies the above-mentioned (a) and (b).

The present invention provides a method for producing a coating composition comprising the steps of:

(i) calcining an α-alumina precursor under an atmosphere of a partial pressure of water vapor of about 600 Pa or less to obtain an α-alumina, and (ii) mixing a binder, a solvent with the obtained α-alumina.

The present invention provides a magnetic recording medium comprising a substrate, and a layer obtained by applying the above-mentioned coating composition on the substrate.

Further, the present invention provides use of an α-alumina powder satisfies the above-mentioned (a) and (b), for a magnetic recording medium.

DETAILED DESCRIPTION OF PREFERRED EMBODIMENTS

I. Coating Composition

Binder

The coating composition of the present invention comprises a binder. The binder may be such that, when the coating composition is applied on a substrate and dried, can fix the α-alumina powder on the substrate, and examples thereof include resins such as thermoplastic resins, thermosetting resins.

Examples of the thermoplastic resin include polymers composed of vinyl chloride, vinyl acetate, vinyl alcohol, maleic acid, acrylic acid, acrylate, vinylidene chloride, acrylonitrile, methacrylic acid, methacrylate, styrene, butadiene, ethylene, vinyl butyral, vinyl acetyl or vinyl ether as a monomer unit, and polyurethane resins and the like. Examples of the thermosetting resin include phenols resins, epoxy resins, polyurethane hardening type resins, urea resins, melamine resins, alkyd resins, acrylic reaction resins, formaldehyde resin, silicone resin, epoxy-polyamide resin and the like. Preferable examples of the binder include a vinyl chloride resin, vinyl chloride-vinyl acetate-copolymer, vinyl chloride-vinyl acetate-vinyl alcohol copolymer, vinyl chloride-vinyl acetate-maleic anhydride copolymer and polyurethane resins.

α-Alumina Powder

The coating composition of the present invention comprises an α-alumina powder. It is preferable that the α-alumina powder has an α phase as main crystal phase, and preferably does not contain substantially other phases (for example, θ phase) than α phase.

The α-alumina powder used for the present invention has a BET specific surface area of about 10 m$^2$/g or more, preferably about 12 m$^2$/g or more, further preferably about 15 m$^2$/g or more, and usually about 50 m$^2$/g or less.

Furthermore, when the α-alumina powder is pressed to obtain a green body and the green body is sintered at 1250° C. under the atmospheric pressure (1 atm) to obtain a sintered body, the obtained sintered body has a relative density which is a ratio of the density $D_0$ of the sintered body to the theoretical density $D_1$ of α-alumina ($D_0/D_1$, hereinafter referred to as relative density) is about 80% or more. Higher relative density is more preferable, and it is preferably about 85% or more, further preferably about 90% or more.

The amount of the α-alumina powder is usually from about 5-fold by weight to about 20-fold by weight based on the above-mentioned binder.

The α-alumina powder may be prepared, for example, by calcining an α-alumina precursor under an atmosphere of a partial pressure of water vapor of about 600 Pa or less.

The α-alumina precursor used as a raw material is that containing compound transforming into α-alumina by calcination in air of 800° C. or higher, and examples of the compound include transition alumina of which crystal phase is γ, χ, θ, δ, σ or κ, amorphous alumina, aluminum hydroxide of which crystal phase is gibbsite, boehmite, pseudo-boehmite, bayerite, norstrandite or diaspore, amorphous aluminum hydroxide, aluminum oxalate, aluminum acetate, aluminum stearate, ammonium alum, aluminum lactate, aluminum laurate, ammonium aluminum carbonate, aluminum sulfate, ammonium aluminum sulfate, aluminum nitrate or ammonium aluminum nitrate, and the like. These can be used alone or in admixture of two or more. The preferable α-alumina precursor is that containing transition aluminum or aluminum hydroxide as a main component. In this case, the amount of transition aluminum or aluminum hydroxide is usually 60% by weight or more, preferably 80% by weight or more based on the α-alumina precursor.

The preferable α-alumina precursor is that containing substantially no metal elements except aluminum, such as α-alumina precursor in which each content of an element such as silicon (Si), iron (Fe), titanium (Ti), sodium (Na) or calcium (Ca) is about 50 ppm or less, further preferable α-alumina precursor in which a total content thereof is about 100 ppm or less.

The α-alumina precursor is preferably calcined in the presence of an α-alumina seed. By calcining an α-alumina precursor in the presence of an α-alumina seed, a finer α-alumina powder may be obtained. In this case, the amount of α-alumina seed in the α-alumina precursor is usually about 1 wt % or more and about 20 wt % or less, preferably about 10 wt % or less based on an α-alumina precursor.

A method for co-existence of an α-alumina precursor with α-alumina seed includes, for example, a method of mixing an α-alumina precursor with an α-alumina particles, or a method of pre-calcining a part of α-alumina precursor to transform the α-alumina precursor into α-alumina seed.

In the case of the method of mixing an α-alumina precursor with an α-alumina particles, the particle diameter of the α-alumina particles is preferably smaller than that of an α-alumina powder which would be obtained by calcining an α-alumina precursor and grinding this, and for example, about 0.1 μm or less.

In the case of method of pre-calcining a part of α-alumina precursor to transform the α-alumina precursor into α-alumina seed, pre-calcination maybe conducted, for example, by maintaining an α-alumina precursor under air of from about 800° C. to about 1200° C. The content of α-alumina seed in the α-alumina precursor may be adjusted by changing pre-calcination temperature and time. Usually, the content of α-alumina seed may be increased by raising pre-calcination temperature or elongating pre-calcination time.

Further, commercially available materials may also be used providing these are α-alumina precursors containing α-alumina (seed) of given amount described above.

An α-alumina precursor containing α-alumina seed may be ground, if necessary. By grinding, α-alumina seed can be uniformly dispersed in an α-alumina precursor. Grinding may be conducted by using a vibration mill, ball mill or jet mill and the like. In grinding, from the viewpoint of reducing pollution with silicon and calcium come from a grinding medium, it is recommended to use alumina having a purity of about 99 wt % or more as a material for grinding media of a vibration mill and ball mill, as a material for nozzles and lines of a jet mill.

The α-alumina precursor preferably has lower bulk density, and for example, the bulk density in terms of α-alumina is preferably about 0.5 g/cm³ or less, further 0.3 g/cm³ or less. By calcining an α-alumina precursor having low bulk density, a finer alumina powder may be obtained. Here, the bulk density in terms of α-alumina is a bulk density obtained by dividing the weight of an α-alumina precursor in terms of $Al_2O_3$ by the volume of an α-alumina precursor.

The above-mentioned α-alumina precursor is calcined. Calcination is conducted under an atmosphere having a controlled partial pressure of water vapor, and specifically, calcination is conducted while maintaining an atmosphere having a partial pressure of water vapor of about 600 Pa or less [dew point is 0° C. or lower in the case of a gas having a total pressure of 1 atm (0.1 MPa)]. The partial pressure of water vapor of a calcination atmosphere is preferably lower, and further preferably about 165 Pa or less (dew point is −15° C. or lower in the case of a gas having a total pressure of 1 atm), particularly 40 Pa or less (dew point is −30° C. or lower in the case of a gas having a total pressure of 1 atm), and calcination may also be conducted under an atmosphere containing utterly no water vapor and having a partial pressure of water vapor of 0 Pa.

Calcination may be advantageously conducted in an apparatus having an atmosphere controlled at a partial pressure of water vapor of about 600 Pa or lower, and for example, may be conducted by using a tubular-type electric furnace, box-type electric furnace, tunnel furnace, far-infrared furnace, microwave furnace, shaft furnace, reflection furnace, rotary furnace, Roller Hearth furnace and discharging a gas from or introducing a gas into the furnace. When an α-alumina precursor such as transition alumina generating little water vapor is used as a raw material, calcination may also be conducted by charging an α-alumina precursor in a vessel, introducing air having a partial pressure of water vapor of about 600 Pa or lower, then, sealing the vessel. Calcination may be conducted also under reduced pressure providing the atmosphere has a partial pressure of water vapor of about 600 Pa or lower, and for example, it can also be conducted under a pressure-reduced atmosphere of a total pressure of about 600 Pa or lower composed of a gas such as air, hydrogen, helium, nitrogen and argon. The calcination furnace used in this case may be of batch-wise or continuous mode. Calcination may be advantageously conducted at temperatures at which an α-alumina precursor can be transformed into α-alumina, and the calcination temperature is usually about 1000° C. or higher, preferably about 1100° C. or higher, further preferably about 1160° C. or higher, and about 1250° C. or lower, preferably about 1200° C. or lower. Calcination time is usually about 10 minutes or more, preferably about 30 minutes or more and about 12 hours or less though varying depending on the type and calcination temperature of a furnace used.

The gas introduced into a furnace is preferably that having controlled partial pressure of water vapor, and for example, there can be suitably used dry air obtained by compressing air to condense moisture contained in the air, separating this condensed moisture, then, reducing pressure, dry air obtained by removing moisture from air by a dehumidifier, dry nitrogen obtained by vaporizing liquid nitrogen, and the like. Cylinder filled with air, helium, nitrogen and the like may be used providing these do not contain moisture.

The calcined α-alumina obtained in calcination may be subjected to particle diameter control such as grinding, classification. Grinding maybe conducted by using a vibration mill, ball mill, jet mill, and classification may be conducted by using a sieve and the like. The calcined α-alumina can be easily ground to give α-alumina powder.

Solvent

The coating composition of the present invention comprises a solvent. The solvent is usually an organic solvent and examples thereof include ketones such as methyl ethyl ketone and cyclohexanone, aromatic hydrocarbons such as toluene and xylene. The amount of the solvent is usually from about 10-fold by weight to about 50-fold by weight based on an above-mentioned binder.

Magnetic Powder

The coating composition of the present invention used for magnetic layer comprises magnetic powder. The magnetic powder includes metals and metal oxides, and preferably metal such as α-Fe.

Additive

The coating composition of the present invention may further comprise additives. The additives include lubricants, antistatic agents, surfactants and the like.

Examples of the lubricant include fatty acids (capric acid, caprylic acid, lauric acid, myristic acid, palmitic acid, stearic acid, behenic acid, oleic acid, elaidic acid, linolic acid, linolenic acid, isostearic acid and the like) and fatty esters (butyl esters, octyl esters, isooctyl esters, amyl esters and the like of the above-mentioned fatty acids).

The antistatic agent is for example carbon black.

Example of the surfactant include alkylene oxide surfactants; glycerin-based surfactants; glycidol surfactants; nonionic surfactants such as alkylphenol ethylene oxide adduct; anionic surfactants such as cyclic amine, ester amine, quaternary ammonium salts, hydantoin derivative, phosphonium salt, sulfonium salt; ampholytic surfactants such as amino acids, aminosulfonic acids. These surfactants may function as an antistatic agent.

The coating composition of the present invention usually is used for formation of a coating film. The coating film may be formed by applying the coating composition on a substrate and drying this. The resultant coating film usually comprises a binder and the above-mentioned alumina powder.

The coating composition is suitably used for formation of a magnetic layer or non-magnetic layer. The non-magnetic layer may be formed by applying a coating composition without the magnetic powder on a substrate and drying this. The magnetic layer may be formed, for example, by applying a coating composition with the magnetic powder on a substrate or non-magnetic layer (formed on a substrate) and drying this. Further, non-magnetic layers and magnetic layers may also be formed alternately. If magnetic layers and non-magnetic layers are thus formed on a substrate, a magnetic recording medium is obtained.

The substrate is usually a film made of, for example, polyesters such as polyethylene terephthalate, polyethylene naphthalate and the like, polyolefins such as polyethylene, triacetyl cellulose, polycarbonate, polyamide, polyimide, polysulfone and the like.

Application of a coating composition on a substrate may be conducted, for example, by using a gravure printing method, doctor blade method and the like. Drying may be conducted under a condition by which a solvent contained in a coating composition can be evaporated.

The coating composition of the present invention is suitably used for formation of magnetic recording media, particularly, a magnetic layer or non-magnetic layer of a magnetic recording medium of high recording density. The magnetic recording medium of high recording density is that which is usually called a multi-layer magnetic recording medium, and examples thereof include magnetic tapes for broadcasting such as DVCPRO, HDCAM, β cam and digital β cam, data storage magnetic tapes such as DDS-2, DDS-3, DDS-4, D8, DLT, S-DLT, LTO, DTF, SD1 and IBM3509 (used for data back up of computer).

II. Method for Producing Coating Composition

The coating composition may be produced by a method for mixing a binder, a solvent with an α-alumina powder. Mixing may be conducted under stirring, and stirring may be advantageously conducted by adding a mixture to a spherical medium inactive to the mixture and fluidizing this. Mixing may be conducted by using a sand grinder. As the medium, for example, glass beads having a particle diameter of 0.05 to 5 mm are preferably used, and usually, separated from the mixture after stirring.

In the case of a coating composition containing a magnetic powder or additives, a magnetic powder or additives maybe added together with a binder and α-alumina powder to a solvent, alternatively, after stirring a mixture obtained by adding a binder and α-alumina powder to a solvent, a magnetic powder or additives may be added to the mixture.

EXAMPLES

The present invention will be illustrated further specifically by examples, but the present invention is not limited to these examples. The properties of α-alumina were measured by the following methods.

Crystal Phase:

A sample was analyzed by using an X-ray diffractometer (trade name: Rint-2100, manufactured by Rigaku Denki), crystal phases were identified from peak data of the obtained XRD spectrum, and that of the highest relative peak intensity of them was used as the main crystal phase.

BET Specific Surface Area ($m^2/g$):

It was measured by a nitrogen adsorption method.

Relative Density (%):

A sample was mono-axially pressed, further, subjected to CIP at 100 MPa, then, the green body was sintered at 1250° C. under 1 atm to obtain a sintered body. The ratio $D_1/D_0$ of the density $D_1$ of the sintered body to the theoretical density $D_0$ of α-alumina was used as relative density.

Content of Si, Fe, Ti, Na and Ca (ppm):

It was measured by an X-ray fluorescence spectroscopy.

Average Particle Diameter (μm):

It was measured by using a laser scattering particle size analyzer (trade name, "Microtrac HRA X-100" manufactured by Nikkiso Co., Ltd.)

Example 1

[Preparation of α-Alumina Powder]

Aluminum hydroxide obtained by hydrolyzing aluminum isopropoxide was pre-calcined, to obtain transition alumina having a θ phase as main crystal phase and containing α-alumina in an amount of 3 wt %. Regarding the α-alumina content in the transition alumina, the transition alumina was analyzed by using an X-ray diffractometer, and comparing the XRD spectrum with standard spectrum obtained by adding α-alumina in given amount to transition alumina, the α-alumina content was calculated.

The above-mentioned transition alumina was ground by using a jet mill, to obtain a transition alumina powder having a bulk density (in terms of α-alumina) of 0.21 $g/cm^3$.

100 g of the above-mentioned transition alumina powder was charged in an atmospheric calcination furnace (trade name: "Tubular atmospheric furnace", manufactured by Motoyama K.K.) having a content volume of 8 L, dry air having a dew point of −15° C. (the partial pressure of water vapor of 165 Pa) was introduced into the furnace at a rate of 1 L/min, and the temperature was raised up to 1170° C. while maintaining the dew point of the atmosphere in the furnace at −15° C., and the temperature was maintained for 3 hours, then, the temperature was gradually lowered, to obtain a calcined alumina. This calcined alumina had a BET specific surface area of 13 $m^2/g$, had an α phase as main crystal phase and had an average particle diameter of 0.1 μm. The calcined alumina contained no θ-alumina. The amount of θ-alumina was measured by a method in which the calcined alumina was analyzed by using an X-ray diffractometer, and from the XRD spectrum, the peak intensity Z of θ phase (diffraction angle: 32.7°) and the peak intensity W of α phase (diffraction angle: 57.5°) were measured, and the ratio Z/W was calculated. When the ratio Z/W was more than 0.01, it was decided that a θ phase was present.

The above-mentioned calcined alumina was ground by using a medium stirring type mill (grinding medium: alumina ball having a diameter of 5 mm), to obtain an α-alumina powder (A). The properties of the α-alumina powder (A) are shown in Table 1. The α-alumina powder (A) had a Si content of 4 ppm, a Fe content of 3 ppm, a Ti content of less than 1 ppm (detection lower limit), a Na content of 6 ppm, a Ca content of less than 1 ppm (detection lower limit), and a purity of 99.998%.

[Production and Evaluation of Coating Composition]

30 parts by weight of the above-mentioned α-alumina powder (A), 2.4 parts by weight of a vinyl chloride resin (trade name: MR110, manufactured by Nippon Xeon Co., Ltd.), 40.6 parts by weight of methyl ethyl ketone and 27 parts by weight of cyclohexanone were stirred by using a batch-mode sand grinder (medium: glass bead having a diameter of 2 mm, rotation speed: 2000 rpm). 2 hours after initiation, stirring was terminated, and the content was removed so that glass beads were not contained. The properties of the obtained coating composition are shown in Table 2.

The above-mentioned coating composition was applied on one surface of a polyethylene terephthalate film having a thickness of 14 μm by using a doctor blade, and dried to form a coating film having a thickness of 45 μm. The smoothness of the obtained coating film was evaluated. The results are shown in Table 2. Evaluation of smoothness was conducted under conditions of an incidence angle of 45° and a reflection angle of 45° according to JIS Z8741, and a gloss value was used as an index. When the gloss value is higher, smoothness is higher.

Example 2

A coating composition was obtained in the same operation as in Example 1 [Production and evaluation of coating composition] excepting that the stirring time was changed to 6 hours. The properties of the obtained coating composition and the evaluation results are shown in Table 2.

Example 3

An α-alumina powder (B) was obtained in the same operation as in Example 1 [Preparation of α-alumina powder] excepting that the calcination temperature was changed to 1220° C. The properties of the α-alumina powder (B) are shown in Table 1. The α-alumina powder (B) had a Si content of 7 ppm, a Fe content of 6 ppm, a Ti content of less than 1 ppm (detection lower limit), a Na content of 16 ppm, a Ca content of less than 1 ppm (detection lower limit), and a purity of 99.996%.

A coating composition was obtained in the same operation as in Example 1 [Production and evaluation of coating composition] excepting that the α-alumina powder (B) was used instead of the α-alumina powder (A) and the stirring time was changed to 6 hours. The properties of the obtained coating composition and the evaluation results are shown in Table 2.

COMPARATIVE EXAMPLE 1

A coating composition was obtained in the same operation as in Example 1 [Production and evaluation of coating composition] excepting that an α-alumina powder (trade name: HIT-80, manufactured by Sumitomo Chemical Co., Ltd.) was used instead of the α-alumina powder (A) and the stirring time was changed to 6 hours. The properties of the obtained coating composition and the evaluation results are shown in Table 2.

COMPARATIVE EXAMPLE 2

A coating composition was obtained in the same operation as in Example 1 [Production and evaluation of coating composition] excepting that an α-alumina powder (trade name: HIT-50, manufactured by Sumitomo Chemical Co., Ltd.) was used instead of the α-alumina powder (A) and the stirring time was changed to 6 hours. The properties of the obtained coating composition and the evaluation results are shown in Table 2.

TABLE 1

| α-alumina powder | Main crystal phase | BET specific surface area $m^2/g$ | Relative density % |
|---|---|---|---|
| α-alumina (A) | α | 19 | 95 |
| α-alumina (B) | α | 13 | 91 |
| HIT-80 | α | 20 | 56 |
| HIT-50 | α | 8.5 | 61 |

TABLE 2

| | Coating composition | | |
|---|---|---|---|
| | Main component of solid | Average particle diameter of solid μm | Coating film Gloss value % |
| Example 1 | α-alumina (A) | 0.27 | 70 |
| Example 2 | α-alumina (A) | 0.2 | 102 |
| Example 3 | α-alumina (B) | 0.21 | 99 |
| Comparative example 1 | HIT-80 | 0.39 | 48 |
| Comparative example 2 | HIT-50 | 0.32 | 26 |

What is claimed is:

1. A coating composition comprising a binder, a solvent, and an α-alumina powder, wherein the α-alumina powder satisfies the following (a) and (b):
   (a) when the α-alumina powder is pressed to obtain a green body and the green body is sintered at 1250° C. under atmospheric pressure, the sintered body has a relative density of about 80% or more, and
   (b) a BET specific surface area of the α-alumina powder is about 10 $m^2/g$;
   and wherein the α-alumina powder is obtained by calcining an α-alumina precursor in an atmosphere of a partial pressure of water vapor of about 600 Pa or less, and wherein silicon, iron, titanium, sodium and calcium are each contained in the α-alumina precursor in an amount of about 50 ppm or less.

2. The coating composition according to claim 1, wherein the amount of the α-alumina powder is from about 5-fold by weight to about 20-fold by weight based on the binder.

3. The coating composition according to claim 1, wherein the binder is a resin.

4. The coating composition according to claim 3, wherein the resin is at least one selected from the group consisting of thermoplastic resins and thermosetting resins.

5. The coating composition according to claim 1, wherein the solvent is an organic solvent.

6. The coating composition according to claim 5, wherein the organic solvent is at least one selected from the group consisting of ketones and aromatic hydrocarbons.

7. A coating film comprising a binder and an α-alumina powder, wherein the α-alumina powder satisfies the following (a) and (b):
  (a) when the α-alumina powder is pressed to obtain a green body and the green body is sintered at 1250° C. under atmospheric pressure, the sintered body has a relative density of about 80% or more, and
  (b) a BET specific surface area of the α-alumina powder is about 10 $m^2/g$;
and wherein the α-alumina powder is obtained by calcining an α-alumina precursor in an atmosphere of a partial pressure of water vapor of about 600 Pa or less, and wherein silicon, iron, titanium, sodium and calcium are each contained in the α-alumina precursor in an amount of about 50 ppm or less.

8. A method for producing a coating composition comprising the steps of:
  (i) calcining an α-alumina precursor under an atmosphere of a partial pressure of water vapor of about 600 Pa or less to obtain an α-alumina, and
  (ii) mixing a binder, a solvent with the obtained α-alumina; wherein the α-alumina satisfies the following (a) and (b):
    (a) when the α-alumina is pressed to obtain a green body and the green body is sintered at 1250° C. under atmospheric pressure, the sintered body has a relative density of about 80% or more, and
    (b) a BET specific surface area of the α-alumina is about 10 $m^2/g$;
and wherein silicon, iron, titanium, sodium and calcium are each contained in the α-alumina precursor in an amount of about 50 ppm or less.

9. The method according to claim 8, wherein the α-alumina precursor is at least one selected from the group consisting of transition alumina, aluminum hydroxide, aluminum oxalate, aluminum acetate, aluminum stearate, ammonium alum, aluminum lactate, aluminum laurate, ammonium aluminum carbonate, aluminum sulfate and aluminum nitrate.

* * * * *